United States Patent [19]

Fisk et al.

[11] 3,928,029

[45] Dec. 23, 1975

[54] BRAZE ALLOY SYSTEM

[75] Inventors: Harry R. Fisk; Jeffrey J. Clark, both of Tempe, Ariz.

[73] Assignee: The Garrett Corporation, Los Angeles, Calif.

[22] Filed: Feb. 27, 1974

[21] Appl. No.: 446,434

[52] U.S. Cl. .................. 75/159; 75/153; 75/161
[51] Int. Cl.² .......................................... C22C 9/05
[58] Field of Search ........ 75/153, 159, 161; 148/31, 148/34, 127; 29/501, 504

[56] References Cited
UNITED STATES PATENTS

| | | | |
|---|---|---|---|
| 385,909 | 7/1888 | Church | 75/159 |
| 2,270,868 | 1/1942 | Dean et al. | 75/159 |
| 3,197,859 | 8/1965 | Cape | 29/501 |
| 3,198,609 | 8/1965 | Cape | 75/159 X |
| 3,519,416 | 7/1970 | Mizuhara | 75/159 X |
| 3,693,246 | 9/1972 | Novikov et al. | 75/159 X |

FOREIGN PATENTS OR APPLICATIONS

| | | | |
|---|---|---|---|
| 638,485 | 3/1962 | Canada | 75/159 |

*Primary Examiner*—C. Lovell
*Attorney, Agent, or Firm*—Ronald L. Grudziecki; Jack D. Puffer; Albert J. Miller

[57] ABSTRACT

A new composition particularly adapted for use as a brazing alloy is disclosed. The composition comprises, in percent by weight, from about 49 to 58 percent copper, about 25 to 32 percent manganese, about 2 to 10 percent nickel and about 7 to 16 percent gold. A small amount of up to about 4 percent cobalt can also be included. The composition can be used for brazing of high performance structural materials such as turbine or compressor components to replace high gold-containing alloys of high cost without significantly detrimentally affecting brazement properties.

7 Claims, No Drawings

BRAZE ALLOY SYSTEM

BACKGROUND OF THE INVENTION

There are a number of gold-based brazing alloys which have advantageous properties for brazing high performance metallic structural materials, such as the compressor, rotor and/or stator blades in gas turbine engines. A gold-base brazing alloy containing about 82 weight percent gold and 18 weight percent nickel commercially available from Wesgo Company under the trade name "Nioro", for example, possesses not only the capability of being vacuum brazed at temperatures below the solidus temperature of the structural materials but also has good ductility and machinability and good oxidation resistance up to temperatures of 1000°F. or more. In addition, this brazing alloy flows well, forming structurally sound joints and does not aggressively attack the base metals while in the molten state.

While the above-mentioned brazing alloy has good vacuum brazing characteristics and has found commercial acceptance, this alloy (and any other high gold-brazing alloy) is very expensive. In addition, high gold-based alloys have a high density generally adding weight to the brazed product. The added weight may be disadvantageous (for example, in aerospace applications). Prior attempts to prepare a relatively inexpensive substitute for alloys such as Nioro have apparently not been successful. Generally, other attempts have resulted in brazing alloys which are still expensive, form low melting phases causing liquation problems, provide inadequate oxidation resistance, are difficult to braze in vacuum and/or form intermetallic compounds. The multiphase structure of alloys containing these intermetallic compounds generally adversely affects other important physical characteristics such as errosion of the base metal, ductility, machinability and brazed joint fatigue strength.

The search has continued for an inexpensive brazing alloy which is useful in an oxidizing environment.

It is an object of this invention to provide a relatively inexpensive brazing alloy which has good oxidation resistance up to a temperature of about 1000°F. or more.

It is also an object of this invention to provide a relatively inexpensive brazing alloy which has a solidus temperature below about 1700°F.

It is further an object of this invention to provide a relatively inexpensive brazing alloy which has solid solution strengthening without intermetallic compound formation.

It is still another object of this invention to provide a relatively inexpensive brazing alloy which is suitable for use in a vacuum brazing furnace and the resulting vacuum brazing process.

SUMMARY OF THE INVENTION

In one aspect, the present invention provides a composition particularly adapted for use as a brazing alloy comprising, in percent by weight, from about 49 to 58 percent copper, 25 to 32 percent manganese, about 2 to 10 percent nickel and about 7 to 16 percent gold.

In another aspect, the present invention provides a method of brazing iron, nickel and cobalt alloys which comprises brazing the said alloys with a brazing alloy as described in the preceding paragraph.

Unless otherwise indicated, all percentages, proportions and parts used in the present specification and claims are by weight.

DESCRIPTION OF PREFERRED EMBODIMENTS

In its broadest aspect, the alloy of the present invention which is particularly adapted for use as a brazing alloy comprises from about 49 to 58 percent copper, 25 to 32 percent manganese, 2 to 10 percent nickel and about 7 to 16 percent gold. In addition, up to about 4 percent cobalt can be incorporated in the brazing alloy.

Two preferred brazing alloy compositions have been found to be particularly useful for vacuum brazing of high performance jet engine components.

The first preferred brazing alloy composition comprises from about 49 to 54 percent copper, about 25 to 28 percent manganese, about 2 to 10 percent nickel and about 15 to 16 percent gold.

The second preferred brazing alloy composition comprises from about 56 to 58 percent copper, about 30 to 32 percent manganese, about 2 to 6 percent nickel and about 7 to 8 percent gold.

The brazing alloys of the present invention may be readily formed by simple melting together of the various components to form a homogeneous alloy at a suitable temperature above the liquidus temperature of the alloy which temperature may be, for example, from about 1900° to about 2400° or more, often from about 1950° to about 2350°, preferably from about 2000° to 2300°F. The brazing alloys of the present invention have a solidus temperature of from about 1650° to about 1700°F. and a liquidus temperature of from about 1735° to about 1760°F.

The molten alloy may be cast into strip, bar or ingot and formed in a conventional manner into typical brazing preforms such as foil, wire or powder. In addition, the brazing alloys can be applied also by vapor deposition, metal spray, sputtering or electro mechanical or electroless plating. The brazing alloys of the present invention are particularly useful in brazing various base metals such as the iron, nickel and cobalt alloys generally used in high performance structural assemblies such as the compressor rotor and/or stator blades in gas turbine engines, spacecraft assemblies and other aircraft and aerospace uses. Typically, the base metals brazed with the brazing alloys of the present invention include stainless steels (e.g., the martensitic stainless steels such as 17-4PH and austenitic stainless steels such as Type 347), nickel alloys (e.g., Inconel 718 and Hastelloy X) and cobalt alloys (e.g., L-605), all of which are well-known to those skilled in the art.

Brazing is generally conducted at a temperature below about 1850°F. (e.g., from about 1800° to 1845°F.) and may be performed in the presence of a vacuum, inert gas (e.g., argon) or reducing gas (e.g., hydrogen).

The brazing alloys of the present invention have a cost approximately one-third that of high gold-containing alloys such as the aforementioned Nioro while possessing important brazing characteristics such as the ability to flow and provide sound joints in gaps of sizes of about 0.001 to 0.008 inches, good ductility and machinability, good oxidation resistance to about 1000°F. or higher, joint strength (lap shear, tensile and fatigue) comparable to those presently available and lack of aggressive attack of base metals while molten.

The invention is additionally illustrated in connection with the following Examples which are to be considered as illustrative of the present invention. It should be understood, however, that the invention is not limited to the specific details of the Examples.

EXAMPLE I

The following specific alloys shown in Table I are prepared by the simple melting together of the various components and forming of the alloys into foil of 0.002 inch thickness, wire of 0.0035 inch diameter and powder of from −150 to −250 mesh (ASTM) size. All indicated amounts of the alloy components are by weight.

Table I

| | Alloy | | | | |
|---|---|---|---|---|---|
| | A | B | C | D | E |
| Copper | 58 | 54 | 55.7 | 49 | 50 |
| Manganese | 32 | 28 | 28.8 | 24.5 | 25 |
| Nickel | 2 | 2 | 3.8 | 8.8 | 9 |
| Gold | 8 | 16 | 7.7 | 15.7 | 16 |
| Cobalt | — | — | 4.0 | 2.5 | — |

These alloys have the following liquidus-solidus temperatures as compared with Nioro, a commercially available brazing alloy of 82 percent gold, 18 percent nickel.

Table II

| | Alloy | | | | | |
|---|---|---|---|---|---|---|
| | A | B | C | D | E | Nioro |
| Liquidus Temp., °F. | 1725 | 1725 | 1800 | 1800 | 1740 | 1742 |
| Solidus Temp., °F. | 1660 | 1660 | 1725 | 1725 | 1680 | 1742 |

EXAMPLE II

Inconel 718 base metal plates are brazed (both lap and butt brazed joints) with Nioro (82 percent gold, 18 percent nickel) and Alloy E of Example I. Inconel 718 nominally contains about 50–55 percent nickel (plus cobalt), about 17–21 percent chromium, 4.75–5.5 percent columbium and tantalum, 2.8–3.3 percent molybdenum, 0.65–1.15 percent titanium, 0.20–0.80 percent aluminum, 0.08 percent maximum carbon, balance essentially iron. The Alloy E brazing composition is utilized both in foil and powder form as further indicated below.

The plates are brazed in a vacuum furnace (1 × 10⁻⁴ mm. Hg) at 1825°F. (15 minutes at brazing temperature) and aged (precipitation hardened) at 1325°F. for 8 hours and 1150°F. for 8 hours in an argon atmosphere. After aging, the brazed joints are subjected to various physical testing procedures. Lap shear tensile strength tests are performed in accordance with AMS-5596 on brazed joints having joint gaps of 1, 3 and 8 × 10⁻³ inches at 900°, 1000° and 1100°F.

The results obtained are shown below in Table III.

Table III

| Braze Alloy | Lap Shear Tensile Test | | Shear Strength psi × 10³ |
|---|---|---|---|
| | Joint Gap, inch × 10⁻³ | Test Temp, °F. | |
| Nioro | 1 * | 900 | 51.7 |
| Nioro | 3 * | 900 | 51.6 |
| Nioro | 8 * | 900 | 46.8 |
| E | 1 * | 900 | 40.5 |
| E | 3 * | 900 | 43.3 |
| E | 3 ** | 900 | 48.9 |
| E | 8 * | 900 | 39.7 |
| Nioro | 1 * | 1000 | 45.8 |

Table III-continued

| Braze Alloy | Lap Shear Tensile Test | | Shear Strength psi × 10³ |
|---|---|---|---|
| | Joint Gap, inch × 10⁻³ | Test Temp, °F. | |
| Nioro | 3 * | 1000 | 36.2 |
| Nioro | 8 * | 1000 | 40.9 |
| E | 1 * | 1000 | 37.4 |
| E | 3 * | 1000 | 34.6 |
| E | 3 ** | 1000 | 39.1 |
| E | 8 * | 1000 | 32.1 |
| Nioro | 1 * | 1100 | 37.3 |
| Nioro | 3 * | 1100 | 35.1 |
| Nioro | 8 * | 1100 | 33.1 |
| E | 1 * | 1100 | 31.1 |
| E | 3 * | 1100 | 28.8 |
| E | 8 * | 1100 | 31.9 |

* Brazing composition in wire form
** Brazing composition in powder form

Butt brazed joints (3 × 10⁻³ inch gap) are subjected to rotating beam fatigue strength test at room temperature. The braze alloy composition in each of these joints is supplied as powder. The joints, stress level at which the joints are subjected and the number of cycles to failure at that stress level are shown in Table IV.

Table IV

| Braze Alloy | Fatigue Strength Data of Butt Brazement at Room Temperature | |
|---|---|---|
| | Stress Level | Cycles to Failure |
| Nioro | 60 ksi | 2.3 × 10⁴ |
| | 60 ksi | 2.0 × 10⁴ |
| | 50 ksi | 3.4 × 10⁶ |
| | 40 ksi | 4.7 × 10⁶ |
| | 30 ksi | 1.1 × 10⁷ |
| | 30 ksi | 5.6 × 10⁷ |
| E | 60 ksi | 5.0 × 10⁵ |
| | 60 ksi | 3.7 × 10⁷ |
| | 50 ksi | 1.5 × 10⁷ |
| | 50 ksi | 1.0 × 10⁸ |
| | 40 ksi | 9.5 × 10⁷ |
| | 30 ksi | 2.0 × 10⁷ |
| | 30 ksi | 1.7 × 10⁸ still running |

Oxidation tests are performed by sectioning the specimens of the Alloy E brazed Inconel 718 joints and placing these sections in static air furnaces at 900° and 1000°F. for 1000 hours. The sections are examined at 200 hour intervals and show a slow rate of oxidation into the exposed braze alloy surface. The 900°F. exposure sections show an average oxide depth of approximately 0.002 inch after 1000 hours while the corresponding 1000°F. exposure sections are observed to have an average oxide depth of approximately 0.004 inch. As understood by those skilled in the art, oxidation of the braze alloy layer will decrease with time and further oxidation of these samples even at the elevated test temperatures will be minimal.

Salt sprays tests are performed on samples similar to those used in the oxidation tests. These samples are contacted with a 5 percent sodium chloride solution having a pH of 6.5 to 7.2 at a temperature of 92° to 97°F. for exposure time of 24, 64 and 164 hours. The contacted specimens are observed visually under 40 times magnification as well as cross-sectional microexamination. Neither the 24 nor 64 hour specimens show any corrosion. The 164 hour specimen shows a very slight (about 0.002 inch or less) surface film.

These tests show that the alloy compositions of the present invention have physical properties equivalent to Nioro, a commercially available brazing alloy widely used in industry. The alloys of the present invention show lap shear and butt brazed joint tensile strength values equivalent to Nioro at temperatures up to 1100°F. and room temperature fatigue properties at least equivalent to Nioro at stress levels of 30 to 60 ksi. In addition, the brazements prepared with the brazing alloy compositions of the present invention show satisfactory oxidation resistance and salt spray corrosion resistance values. These alloys are capable of satisfactory utilization in industrial brazing production situations with a resultant cost of about 20 percent of Nioro.

EXAMPLE III

Melts of each of Alloys A, B, C and D of Example I are prepared and formed into foils (0.002 inch thickness) which are thereafter used to vacuum braze compressor subassemblies in a production facility. The alloys each show very good characteristics and compatibility with existing production facilities.

The principles, preferred embodiments and modes of operation of the present invention have been described in the foregoing specification. The invention which is intended to be protected herein, however, is not to be construed as limited to the particular forms disclosed since these are to be regarded as illustrative rather than restrictive. Variations and changes may be made by those skilled in the art without departing from the spirit of the invention.

What is claimed is:

1. A composition adapted for use as a brazing alloy consisting essentially of, in percent by weight, from about 49 to 58 percent copper, about 25 to 32 percent manganese, about 2 to 10 percent nickel, about 7 to 16 percent gold and up to 4 percent cobalt.

2. The composition of claim 1 wherein said alloy comprises from about 56 to 58 percent copper, about 30 to 32 percent manganese, about 2 to 6 percent nickel and 7 to 8 percent gold.

3. The composition of claim 1 wherein said alloy comprises from about 50 to 54 percent copper, about 25 to 28 percent manganese, about 2 to 10 percent nickel and 15 to 16 percent gold.

4. The composition of claim 1 wherein said composition is in the form of a brazing alloy preform.

5. The composition of claim 4 wherein said brazing alloy preform is powder.

6. The composition of claim 4 wherein said brazing alloy preform is foil.

7. The composition of claim 4 wherein said brazing alloy preform is strip.

* * * * *